Nov. 24, 1953  A. E. HUNT  2,660,679
COUPLING SYSTEM FOR INTERCHANGEABLY CONNECTING
THE WIRING SYSTEMS OF TRACTORS AND TRAILERS
Filed March 6, 1952  2 Sheets-Sheet 1

Arthur E. Hunt
INVENTOR.

BY
Attorneys

Nov. 24, 1953  A. E. HUNT  2,660,679
COUPLING SYSTEM FOR INTERCHANGEABLY CONNECTING
THE WIRING SYSTEMS OF TRACTORS AND TRAILERS
Filed March 6, 1952  2 Sheets-Sheet 2

Arthur E. Hunt
INVENTOR.

BY Clarence A. O'Brien
and Harvey B. Jacobson

Patented Nov. 24, 1953

2,660,679

UNITED STATES PATENT OFFICE 2,660,679

COUPLING SYSTEM FOR INTERCHANGEABLY CONNECTING THE WIRING SYSTEMS OF TRACTORS AND TRAILERS

Arthur E. Hunt, Albany, N. Y.

Application March 6, 1952, Serial No. 275,201

4 Claims. (Cl. 307—10)

This invention relates to the electrical coupling between the wiring systems of tractors and trailers or of tractor-trailer combinations and, in general, to the making of electrical connections between load handling vehicles, and it has for its object to provide a connector or coupling system which may be used for coupling different types of tractors with different types of trailers, each provided with a wiring system of its own, for operating its direction signals, stop signals, position lights, etc., and which permits to use a simple and safe standard coupling means between the cables of the said vehicles to be coupled notwithstanding the fact that the vehicles are equipped with wiring systems which may considerably differ from each other.

The background of this invention will be better understood if it is mentioned that each trailer has a number of signal and position or body light circuits, many of them prescribed by the State laws, which must be operated and controlled by the driver on the tractor with which the trailer happens to be coupled. As some of the controls have to be exercised individually to operate each of the signals in conformity with conditions on the road, such signals being, for instance, the directional signals or the stop signals, while other circuits have to be controlled collectively, an example being the groups of position lights or body lights carried by the vehicles, a multiwire cable with a number of independent conductors is provided, the number of conductors being squal to the number of types of signals or groups of lights used on the vehicles. Usually the number of control circuits is either four or six, although this number may be smaller or larger.

As has been mentioned the wiring systems in practical use differ from each other and many carriers use their own wiring system merely joining the wires or leads to a coupling member such as a member of a plug and socket connection into which the corresponding connector member of the tractor has to be inserted.

This system of wiring is clearly only suitable for fixed combinations of tractors and trailers, whether the trailer is a complete separate vehicle or merely is a semi-trailer. Such wiring systems, however, become unworkable if tractors and trailers of different origin and different makes have to be coupled with each other.

However, it is a rule, especially with larger shipping and hauling organizations, that different types of tractors and trailers have to be coupled, sometimes because each tractor has to make many runs before a trailer is unloaded and ready for further hauling so that the tractor cannot operate within a fixed combination, while on the other hand, organizations do not use exclusively vehicles made by a single manufacturer; partly such different combinations also result from the fact that the trailers are provided by the customers or by organizations which are different from those providing the tractors. In fact it is the rule that during a single twenty-four hour period a tractor has to haul quite a number of trailers each of a different type.

A further difficulty when connecting the tractor and the trailer stems from the fact that some tractor and trailer systems are only equipped with a four wire system while others are arranged with a six-wire connection. Therefore, a direct connection between the connecting means of the tractor and trailer is not possible.

On account of these differences of the electric wiring systems and of the wiring carried by both vehicles each combination of trailer and tractor in which vehicles of different types are coupled entails certain repair work in the nature of rewiring. This type of work is not only a constant burden for the personnel, but is also a source of unsafety, because sometimes some connections match and therefore lead to the erroneous belief that the connections have been matched with the result that a dangerous confusion between signals may result.

The invention therefore has for its main object to provide a coupling system in which a fixed plug connector associated with the trailer and with the tractor may be used but in which the tractor embodies, between the switch or distributing box and the plug connection, a connection shifting device which permits to change the connections between the tractor controls and the pins or other connecting elements of the plug connection.

A further object of the invention consists in providing the tractor not only with a connection shifting means but also with a dual plug connector having different connector faces each adapted for connection with a different number of wires and elements.

A further object of the invention consists in providing, on a tractor between the plug connection with which the trailer is connected and the distributing box of the tractor, a switch bank with individually adjustable switches, each having a number of contacts equal to the number of lines to be connected with the trailer and each capable of connecting any control circuit of the tractor with any one of the conductors leading to the plug connection of the tractor.

A further object of the invention consists in providing a tractor plug connection with a number of individually movable and insertable jacks which, after insertion, may be held in their position and may be protected by a holding cap.

Further objects of the invention will be apparent from the following detailed specification.

The invention is illustrated in the accompanying drawing showing several embodiments thereof. It is however to be understood that the embodiments of the invention which have been illustrated are shown by way of example only in order to explain the principle of the invention and the best mode of applying said principle. The specification and drawing will not give a complete survey of all possible embodiments of the invention and a departure from the modifications illustrated is therefore not necessarily a departure from the principle of the invention.

Figure 1:
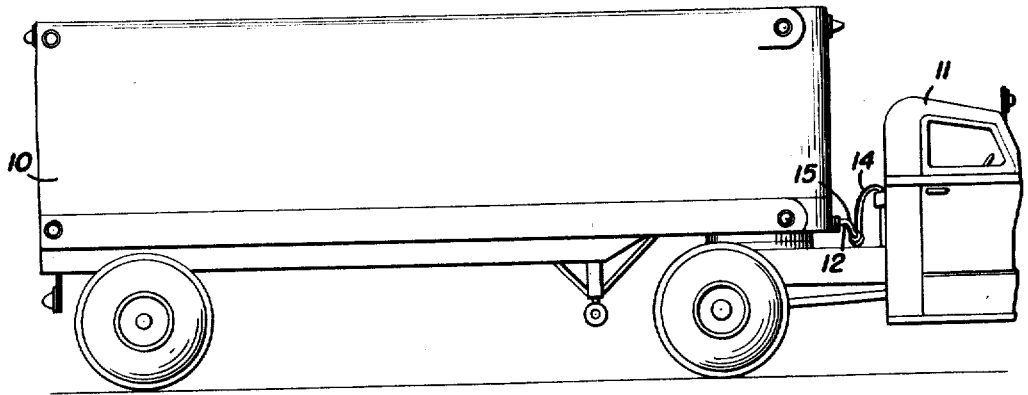
Figure 1 illustrates a tractor-trailer combination with electrical connections made by cables ending in a plug connector.

Referring to Figure 1 the general arrangement of a tractor-trailer combination is shown in this figure in which a semi-trailer 10 and a tractor 11 are connected by means of multi-wire cables 12, 14 and a plug connector 15.

Figure 2:
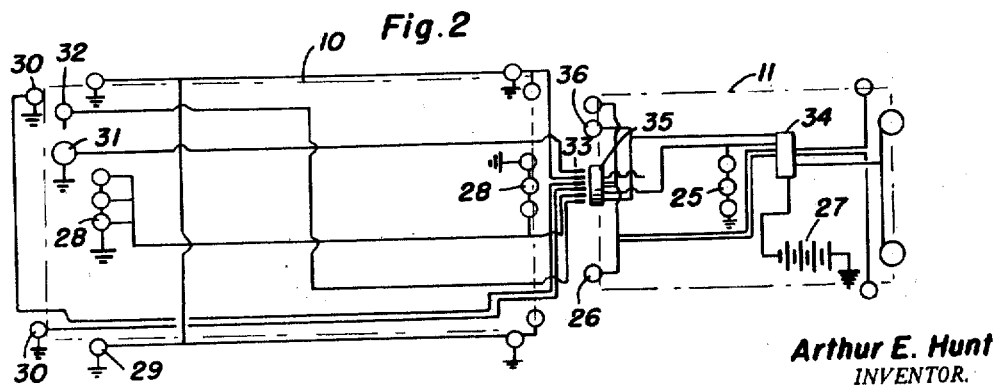
Figure 2 illustrates diagrammatically this combination showing the various circuits of the tractor and of the trailer and their connection by means of a plug connector.

As seen in Figure 2 in which a six wire connection is diagrammatically illustrated, the tractor 11 which carries the grounded battery 27 is provided with a distributor and switch box 34 to which, in addition to the operative circuits of the tractor, such as the ignition circuit, the headlights and other circuits, the body lights 25, the signals 26 indicating directions and the stop light 36 are wired. It will be understood that the direction signal, the stop signal, the caution signal, if any, and the body and position lights of the trailer must be controlled by the controls which are provided in the tractor for the corresponding signals. Therefore each direction signal 30, the stop light 31, the caution or emergency light 32 and the lateral position lights 29 as well as the body lights 28 are energized each by a separate wire which leads to the plug connector socket member 33 of the trailer, the wiring system varying according to the system selected by the manufacturer of the trailer. Further, some trailers are only provided with a wiring system including four wires leading to a separate circuit for each direction signal, a circuit for the automatic stop light, and a further circuit connected with all other circuits which need not be specially controlled in accordance with conditions on the road.

Figure 3:
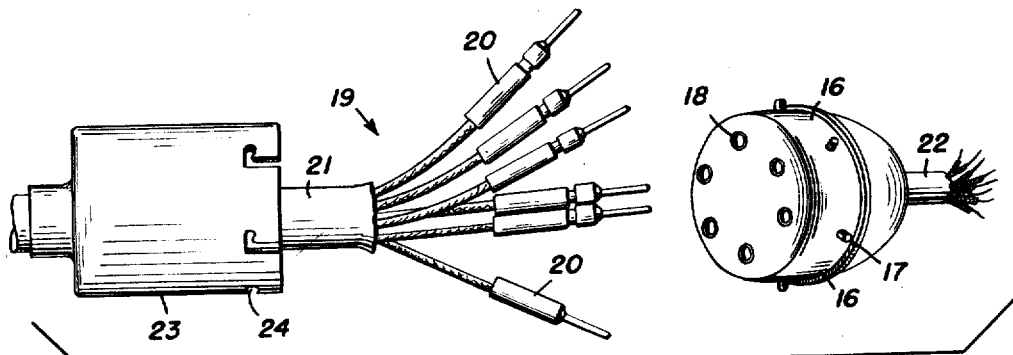
Figure 3 shows a perspective view of one modification of the invention with two members of the plug connector removed from each other and ready for being connected.

In order to be able to control all the trailer circuits by the controls provided on the tractor for the corresponding circuits the tractor is provided with a plug member 35 coupled with the trailer plug member 33 in such a way that the corresponding tractor and trailer circuits are connected. As above described, a special connection shifting means is however necessary to cope with the difficulty of connecting the two systems notwithstanding their different systems of wiring. The most simple interchangeable connection between the tractor and the trailer which needs, however, individual attention for making the proper connections is illustrated in Figure 3. In the example shown in this figure the trailer and the tractor have the same number of wires. The trailer 10 is provided with a plug member 16 which may be provided with bayonet pins 17. The member 16 contains the sockets 18 each of which is connected with one of the wires of the cable indicated at 22.

The tractor has a plug member, generally indicated at 19, comprises a series of individual jacks 20 with which the wire strands of the cable 21 of the tractor are connected. Each wire with its insulation projects from the cable 21 to a certain extent and is provided with an individual jack 20. A cap 23 with bayonet slots 24 is slidably mounted on the end of the cable 21 and when the connections have been made by inserting the jacks 20 into the sockets 18 the cap is moved towards the member 16 and is fixed on said member by means of the bayonet slots.

The connection between the wires of the tractor and the corresponding wires of the trailer must in this case be made individually. It is preferable to mark the jacks 20 and the sockets 18 of the member 16 with colors or by impressed characters or the like, so that the connections may be made in accordance with these characters.

Figure 4:
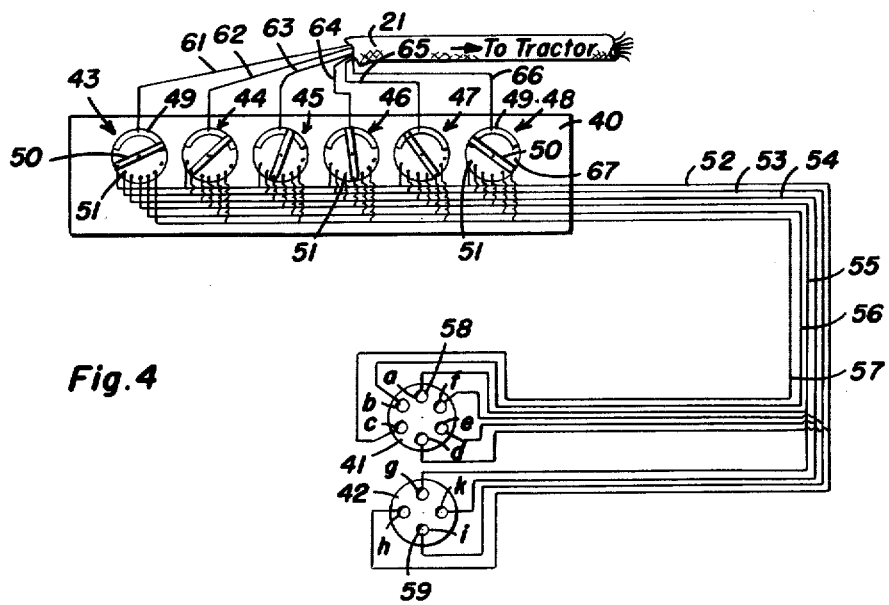
Figure 4 is a diagram of the connections illustrating the wiring system of a tractor with a dual plug connector and with a connection shifting means inserted between the cable leading to the distributor box and the dual connector, the example shown being one in which the tractor is equipped with a six wire system.
Figure 5:
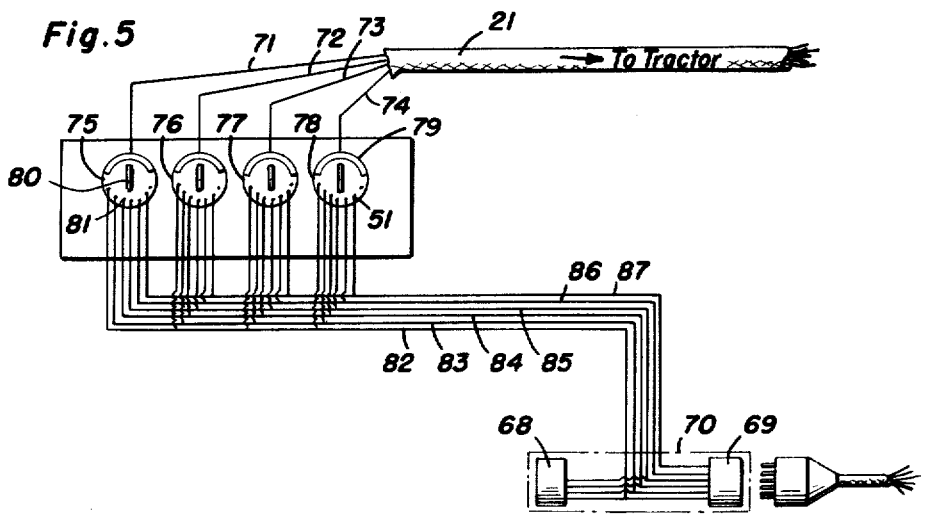
Figure 5 is a similar diagram illustrating the case of a tractor which is equipped with a four wire system.

An improved system requiring less individual attention to details of the connection but which nevertheless proviles freely interchangeable connections is shown in Figures 4 and 5.

Figure 6:
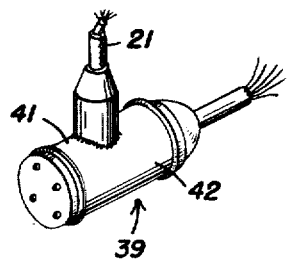
Figure 6 is an elevational view of the dual plug.

Figure 4 diagrammatically illustrates the connection of a tractor the wiring system of which includes six wires with trailers of every possible type the wiring system of which may comprise either four or six wires. The distributing and switching board 34 of the tractor is in this case provided with a switch bank 40 with six individual switches 43, 44 . . . 48, one for each wire leading to the plug connector of the tractor. This plug connector is preferably a dual plug connector 39 such as shown in Figure 6 with two connector members 41, 42, one of said members being provided with six pins for connection with the six wire cable on the trailer and the other being provided with four pins for connection with a four wire cable on the trailer. According to the type of trailer which is coupled with the tractor either the one or the other half of the plug 39 is used.

Each individual switch 43, 44 . . . 48 comprises a contact segment 49, a contact arm 50 and six contacts 51 facing the contact segment 49. By means of the movable contact arm the segment 49 may be connected with any one of the six contacts 51. In addition to the six contacts 51 each of the switches may also have an off contact 67.

Each of the contacts 51 is connected with a wire strand 52, 53, 54 . . . 57 each leading to one of the pins 58 in the plug member 41. The plugs are indicated by letters a, b, c . . . f. As the segment 49 of each switch 43, 44 ... 48 is connected with one of the wire strands 61, 62 ... 68 of the cable 21 it is obviously possible, by adjusting the position of the switches 43, 44 ... 48 by means of the contact arm to connect any wire strand 61, 62 ... 68 of cable 21 with any one of the wires 52, 53 ... 57 leading to one of the pins 58a, b, c ... f.

If the wiring system of the trailer is a six wire system the driver when coupling the trailer with a tractor, has merely to adjust the switches 43, 44 ... 48 in his distributing and switching box 34 in accordance with a prescribed pattern to establish full control over the trailer lights by means of the switching devices of the tractor.

The setting of the switches 43, 44 ... 48 needs much less attention than the individual connection between each wire of the tractor with the wire of the trailer. Practically the number of types of trailers hauled by a single tractor is limited and therefore a tabulation showing the setting of the switches for each particular trailer type which is in use may be attached to the switch box, indicating clearly the manipulation to be made when coupling the tractor with a certain type of trailer.

In the second half 42 of the dual connector plug 39 only four pins 59 individually indicated at g, h, i, k are arranged, each pin being connected with one of the four lines 52, 53, 54, 55. These wires usually lead to the two directional signals and to the stop light and to the body lights respectively, and the switches 43, 44 ... 48 must be adjusted accordingly.

Figure 5 illustrates an example of a tractor with a wiring system having four control circuits. Therefore, a connecting cable 21 provided with only four strands of wire 71, 72, 73, 74 leads to a dual plug indicated in dotted lines at 70, one part 68 of which carries four pins for connection with the trailer while the other half 69 carries six pins. The six connections usually comprise an auxiliary conductor used for inner lights or for some caution signal and a further conductor which leads to ground. The two additional conductors remain unconnected, when the trailer is coupled with a four wire trailer and only the four remaining wires are used. Switches 75, 76, 77, 78 are again arranged, each of these switches being again provided with a contact segment 79, a set of six contacts and an off contact 81 and a contact arm, not shown. The adjustment of the switches may be done by means of a handle 80.

The contact segment 79 of each of the switches 75, 76, 77, 78 is connected with one of the strands 71, 72, 73, 74 of the cable 21 of the tractor. The set of contacts 81 is connected with the wire strands 82, 83, 84, 85, 86, 87. The four wires 82-85 may directly be connected with the connector member 68 adapted for a four wire connection while the two additional wires 86, 87 of the six wire connection 69 are joined with the remaining contacts of the series of six contacts. The switches permit, as already described, to connect the cable strand with those sockets wherever they may be located, in the connector, which will make the right connections with the four cable strands on the trailer which are to be connected with the four cable strands on the tractor.

As explained before, the switches 75, 76, 77, 78 have to be set by the driver in accordance with the fixed tabulation directing the setting of the switches for the different types of trailers.

The above described system of interchangeable connections simplifies the operation to a great extent as the personnel which services the tractor and trailer simply couples the tractor with the trailer in the same way, whatever the type of the trailer, and the driver then adjusts the switches in accordance with the indications of a table, thus establishing the connections which link the tractor circuit with the corresponding trailer circuit whatever the location of the socket or pin contacts in the plug to which they have been wired by the manufacturer of the trailer.

It will be understood that unessential changes in the principle of the invention may be made without in any way departing from the essence of the invention as defined by the annexed claims.

Having described the invention what is claimed as new is:

1. An electric coupling system for connecting the wiring systems of a tractor and a trailer having corresponding electrical circuits comprising a fixedly connected connecting plug member of the trailer, said plug member having connector elements connected to the electrical circuits forming the wiring system of the trailer, a connecting plug of said tractor connected to the electrical circuits of the tractor and adapted to connect individual electrical circuits of the tractor with individual connector elements of the connecting plug member on the trailer, and means for shifting the connection of each of the electrical circuits of the tractor to a selected one of said connector elements.

2. An electric coupling system for connecting the wiring systems of a tractor and a trailer having corresponding electrical circuits comprising a fixedly connected connecting plug member of the trailer, said plug member having connector elements connected to the electrical circuits forming the wiring system of the trailer, a connecting plug of said tractor connected to the electrical circuits of the tractor and adapted to connect individual electrical circuits of the tractor with individual connector elements of the connecting plug member on the trailer, and means for shifting the connection of each of the electrical circuits of the tractor to a selected one of said connector elements, said means including a switch bank having a plurality of switches equal to the number of said connector elements, each of said switches including a movable element capable of being moved to any of a plurality of positions, means for making a connection in every position with one of the electrical circuits of the tractor, and means for making a connection with each one of the connector elements of the connecting plug member of the tractor.

3. An electric coupling system for connecting the wiring systems of a tractor and a trailer having corresponding electrical circuits comprising a fixedly connected connecting plug member of the trailer, said plug member having connector elements connected to the electrical circuits forming the wiring system of the trailer, a connecting plug of said tractor connected to the electrical circuits of the tractor and adapted to connect individual electrical circuits of the tractor with individual connector elements of the connecting plug member on the trailer, and means for shifting the connection of each of the electrical circuits of the tractor to a selected one of said connector elements, said connecting plug member of said tractor being a dual plug member provided with two connector means, each of said connector means being provided with a different number of connector elements for connection with the corresponding connector elements on a selected trailer.

4. An electric coupling system for connecting the wiring systems of a tractor and a trailer having corresponding electrical circuits comprising a fixedly connected connecting plug member of the trailer, said plug member having connector elements connected to the electrical circuits forming the wiring system of the trailer, a connecting plug of said tractor connected to the electrical circuits of the tractor and adapted to connect individual electrical circuits of the tractor with individual connector elements of the connecting plug member on the trailer, and means for shifting the connection of each of the electrical circuits of the tractor to a selected one of said connector elements, said means including a switch bank having a plurality of switches equal to the number of said connector elements, each of said switches including a movable element capable of being moved to any of a plurality of positions, means for making a connection in every position with one of the electrical circuits of the tractor, and means for making a connection with each one of the connector elements of the connecting plug member of the tractor, said connecting plug member of said tractor being a dual plug member provided with two connector means, each of said connector means being provided with a different number of connector elements for connection with the corresponding connector elements on a selected trailer.

ARTHUR E. HUNT.

References Cited in the file of this patent

UNITED STATES PATENTS

| Number | Name | Date |
|---|---|---|
| 1,593,966 | Davis | July 27, 1926 |